United States Patent
Koizumi

(10) Patent No.: US 8,477,221 B2
(45) Date of Patent: Jul. 2, 2013

(54) IMAGE SENSING SYSTEM AND CORRECTION METHOD

(75) Inventor: Satoshi Koizumi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 352 days.

(21) Appl. No.: 12/886,844

(22) Filed: Sep. 21, 2010

(65) Prior Publication Data

US 2011/0090379 A1   Apr. 21, 2011

(30) Foreign Application Priority Data

Oct. 20, 2009   (JP) .................................. 2009-241888

(51) Int. Cl.
*H04N 9/64* (2006.01)

(52) U.S. Cl.
USPC .......................................................... 348/251

(58) Field of Classification Search
USPC .......................................................... 348/251
See application file for complete search history.

(56) References Cited

U.S. PATENT DOCUMENTS

| | | | |
|---|---|---|---|
| 6,937,777 B2 | 8/2005 | Shirakawa | |
| 7,367,537 B2 | 5/2008 | Ibe | |
| 7,646,406 B2 | 1/2010 | Nishimura | |
| 2002/0094131 A1 | 7/2002 | Shirakawa | |
| 2004/0239784 A1 | 12/2004 | Ibe | |
| 2005/0185066 A1 | 8/2005 | Nishimura | |
| 2008/0074515 A1* | 3/2008 | Takane | 348/251 |

FOREIGN PATENT DOCUMENTS

| | | |
|---|---|---|
| JP | 2002-218298 A | 8/2002 |
| JP | 2004-297132 A | 10/2004 |
| JP | 2005-094191 A | 4/2005 |
| JP | 2005-244423 A | 9/2005 |
| JP | 2008-053931 A | 3/2008 |
| JP | 2008-153848 A | 7/2008 |

\* cited by examiner

*Primary Examiner* — Anthony J Daniels
(74) *Attorney, Agent, or Firm* — Fitzpatrick, Cella, Harper & Scinto

(57) ABSTRACT

An image sensing system comprises an image sensor having an image sensing surface, a filter arranged between the image sensing surface and an optical system which forms an image of an object on the image sensing surface, a sensor configured to detect a luminance of the object in a band in the vicinity of a cutoff wavelength of the filter relative to an average luminance of the object via the optical system, and a corrector configured to execute color shading correction of the image, sensed by the image sensor, using a color shading correction coefficient determined by the relative luminance detected by the sensor.

7 Claims, 4 Drawing Sheets

IMAGE SENSING SYSTEM AND CORRECTION METHOD

BACKGROUND OF THE INVENTION

1. Field of the Invention

The present invention relates to an image sensing system and a correction method.

2. Description of the Related Art

Image sensors typified by a CCD image sensor and a CMOS image sensor have higher sensitivities to infrared light than the spectral sensitivity characteristic (spectral luminous efficiency) of human eyes. Hence, an infrared cut filter can generally be arranged between a camera lens and the image sensing surface of an image sensor. A dichroic filter, for example, can be used as the infrared cut filter.

A principal ray which reaches the center of the dichroic filter upon passing through the camera lens is perpendicular to the dichroic filter surface, whereas that which reaches the periphery in the plane of the image sensing surface of the image sensor makes a certain angle with the dichroic filter surface. The larger the distance from the center of the image sensing surface (i.e., the higher the image height), and the smaller the exit pupil distance of the camera lens, the larger the incident angle on the dichroic filter surface becomes. In this manner, a dichroic filter has a characteristic with incident angle dependence, so the intensity of light which strikes the image sensor upon passing through the dichroic filter differs depending on the image height. This generates color shading (color variation) in the sensed image.

To correct the color shading, an apparatus described in Japanese Patent Laid-Open No. 2008-153848 detects a fluorescent flicker to distinguish between a fluorescent light source and other light sources, and adjusts a color shading correction coefficient in accordance with the type of light source.

However, in the apparatus described in Japanese Patent Laid-Open No. 2008-153848, the type of light source is determined using information from the image sensor, so no information regarding a band outside the wavelength range defined by the cutoff wavelength of the infrared cut filter is taken into consideration, and this determination is influenced by the incident angle dependence of this filter. Therefore, the luminance of an object in a wavelength range in the vicinity of the cutoff wavelength relative to the average luminance of the object cannot be detected with high accuracy, and this may lead to excessive or poor correction.

SUMMARY OF THE INVENTION

The present invention provides a technique advantageous to improve the accuracy of color shading correction by accurately detecting the luminance of an object in a wavelength range in the vicinity of the cutoff wavelength relative to the average luminance of the object.

One of the aspects of the present invention provides an image sensing system comprising an image sensor having an image sensing surface, a filter arranged between the image sensing surface and an optical system which forms an image of an object on the image sensing surface, a sensor configured to detect a luminance of the object in a band in the vicinity of a cutoff wavelength of the filter relative to an average luminance of the object via the optical system, and a corrector configured to execute color shading correction of the image, sensed by the image sensor, using a color shading correction coefficient determined by the relative luminance detected by the sensor.

Further features of the present invention will become apparent from the following description of exemplary embodiments with reference to the attached drawings.

DESCRIPTION OF THE EMBODIMENTS

An image sensing system according to the present invention is applicable to digital cameras such as a digital single-lens reflex camera, a digital compact camera, and a digital movie camera. In the image sensing system according to the present invention, an optical system which forms an image of an object on the image sensing surface of an image sensor may be exchangeable or fixed.

Figure 1:
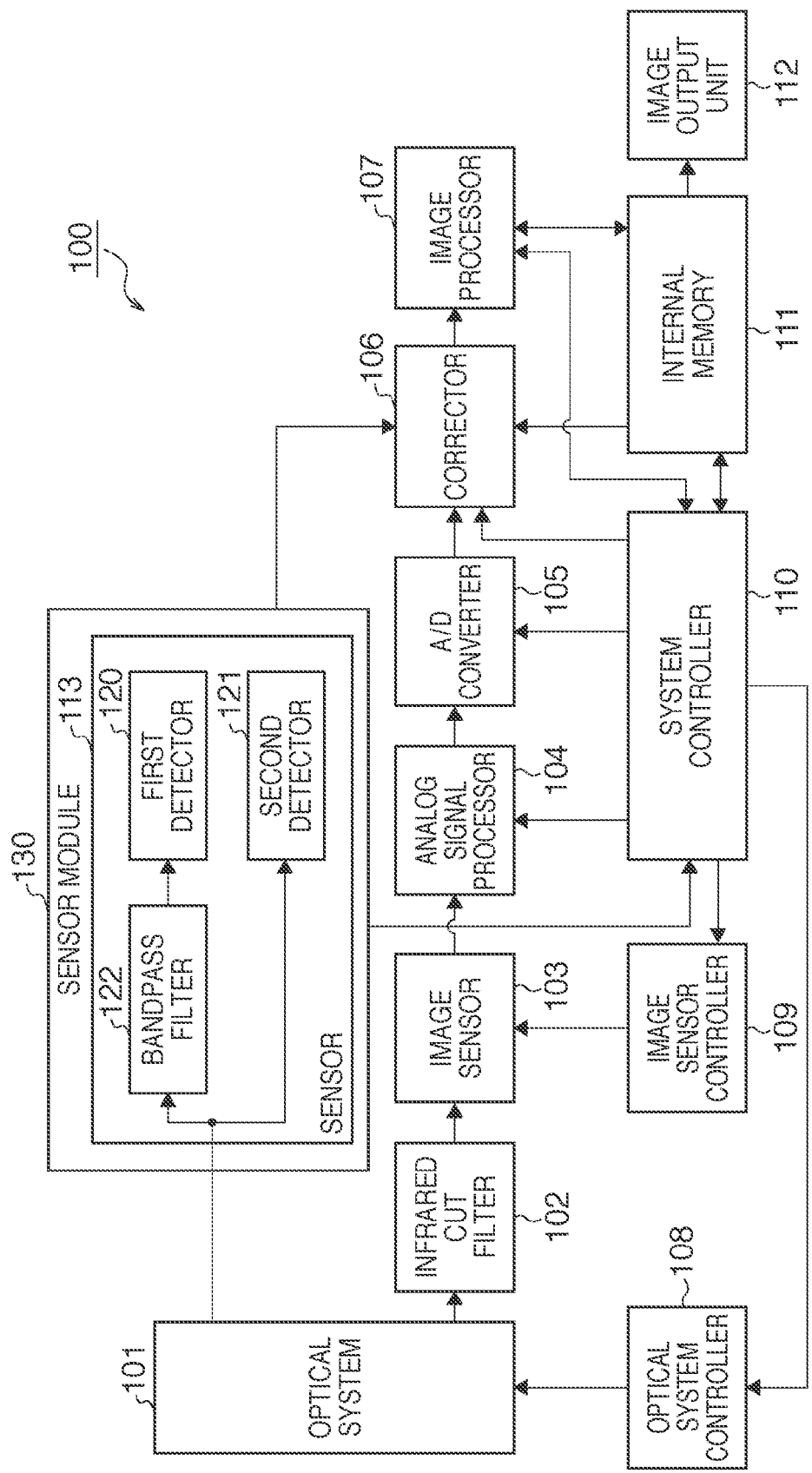
FIG. 1 is a block diagram showing the configuration of a digital single-lens reflex camera as one embodiment of an image sensing system according to the present invention.

The configuration and operation of a digital single-lens reflex camera (to be simply referred to as a camera hereinafter) 100 as one embodiment of an image sensing system according to the present invention will be described with reference to FIG. 1. The camera 100 includes an image sensor 103 having an image sensing surface, and an infrared cut filter 102 arranged between the image sensing surface and an optical system 101 which forms an image of an object on the image sensing surface. The camera 100 also includes a sensor 113 and corrector 106. The sensor 113 detects the luminance of an object in a band in the vicinity of the cutoff wavelength of the infrared cut filter 102 relative to the average luminance of the object via the optical system 101. The corrector 106 executes color shading correction of a red signal in the image, sensed by the image sensor 103, using a color shading correction coefficient with a value which increases as the relative luminance detected by the sensor 113 gets higher. Note that the image sensed by the image sensor 103 may or may not be processed after being output from the image sensor 103. In this embodiment, an image is output from the image sensor 103 in the form of an analog signal, and is processed (e.g., undergoes noise elimination) by an analog signal processor 104. The image processed by the analog signal processor 104 is converted into an image in the form of a digital signal by an A/D converter 105, and undergoes color shading correction by the corrector 106.

Except for the time of exposure of the image sensor 103, light which comes from the object and passes through the optical system 101 strikes an optical viewfinder (not shown) and the sensor 113 via an optical system (not shown). In this embodiment, the sensor 113 can be built into a sensor module 130 including at least one of an AF (Auto Focus) sensor and an AE (Auto Exposure) sensor.

An optical system controller 108 controls the focus and aperture of the optical system 101. An image sensor controller 109 controls the driving timing of the image sensor 103. A system controller 110 controls the overall camera (image sensing system) 100. An image processor 107 performs a development process (e.g., a color process) for the image having undergone color shading correction. An internal memory 111 stores a color shading correction coefficient, and the processed image. The processed image is output to an image output unit 112 including a display such as a liquid-crystal display.

Figure 2:
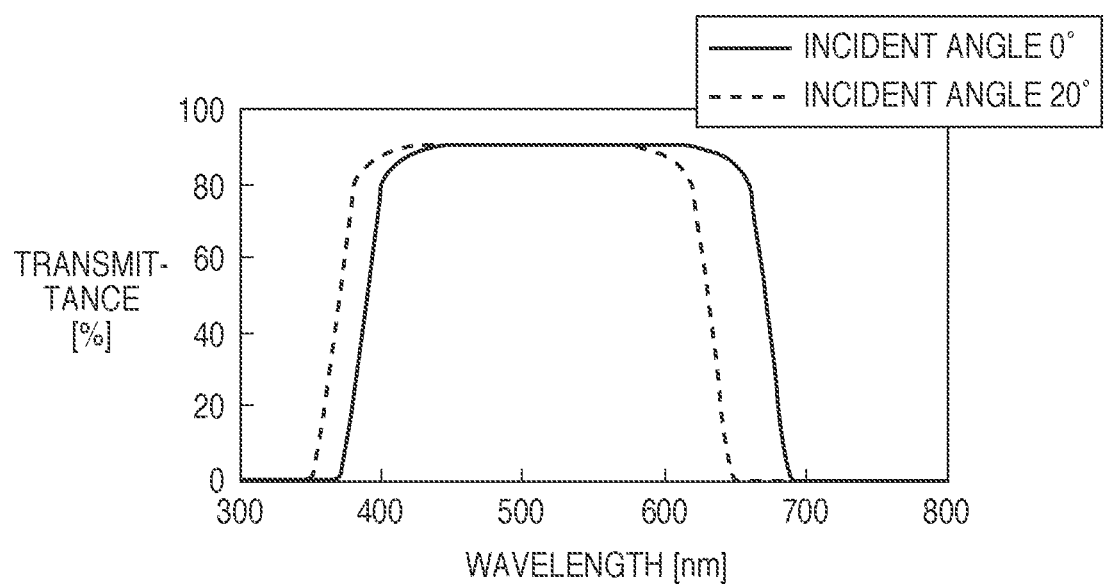
FIG. 2 is a graph illustrating the incident angle dependence of the cutoff wavelength of an infrared cut filter.

An arrangement for detecting the luminance of an object in a band in the vicinity of the cutoff wavelength of the infrared cut filter 102 relative to the average luminance of the object will be described next. FIG. 2 illustrates the incident angle dependence of the cutoff wavelength of the infrared cut filter 102. The incident angle is an angle with respect to a normal to the surface of the infrared cut filter 102. Referring to FIG. 2, a solid line indicates the spectral transmittance when the incident angle is 0° (in this case, the light perpendicularly strikes the surface of the infrared cut filter 102). Referring to FIG. 2 as well, a dotted line indicates the spectral transmittance when the incident angle is 20°. As can be seen from FIG. 2, the cutoff wavelength shifts toward the short-wavelength side as the incident angle increases. This means that as the incident angle increases, a filter becomes less likely to pass red wavelengths on the infrared cutoff side, while it becomes more likely to pass blue wavelengths on the ultraviolet cutoff side.

In this embodiment, the sensor 113 includes a bandpass filter 122, first detector 120, and second detector 121. The bandpass filter 122 passes components, in a band in the vicinity of the cutoff wavelength of the infrared cut filter 102, of the light having passed through the optical system 101. The first detector 120 detects the light having passed through the bandpass filter 122. The second detector 121 detects components, in a band wider than the passband of the bandpass filter 122, of the light having passed through the optical system 101. The bandpass filter 122 is arranged between the optical system 101 and the first detector 120 such that, for example, it can come into contact with the first detector 120. No filter or a filter which passes light in a band (typically, the visible light band) wider than the passband of the bandpass filter 122 can be arranged between the second detector 121 and the optical system 101. The sensor 113 detects the average luminance of an object using the second detector 121, and detects the luminance of the object in a band in the vicinity of the cutoff wavelength of the infrared cut filter 102 using the first detector 120. Thus, the sensor 113 detects the luminance of an object in a band in the vicinity of the cutoff wavelength of the infrared cut filter 102 relative to the average luminance of the object. Each of the first detector 120 and second detector 121 includes at least one photoelectric conversion element (or pixel).

When the sensor 113 is built into the sensor module 130 including at least one of an AF sensor and an AE sensor, the sensor module 130 can include an image sensor having a plurality of pixels. Such an image sensor of the sensor module 130 can include a first region including a plurality of pixels which constitute the first detector 120, and a second region including a plurality of pixels which constitute the second detector 121. The second region can be the same as a region including pixels which constitute an AF sensor or an AE sensor. Alternatively, the second region can partially overlap at least part of a region including pixels which constitute an AF sensor or an AE sensor. Increases in cost and number of parts can be suppressed by using some of the plurality of pixels of the image sensor serving as at least one of an AF sensor and an AE sensor as pixels to constitute the second detector 121. Also, since an AF sensor is generally designed to detect the focus at least at the field center (i.e., the position at zero image height), the first detector 120 and second detector 121 can easily be arranged near the field center (i.e., at zero image height or in its vicinity).

In the above-mentioned example, the bandpass filter 122 limits the band of the light detected by the first detector 120. Instead of providing the bandpass filter 122, the depth of the photoelectric conversion element of the first detector 120 (its depth from the surface of the semiconductor substrate) may be set so as to selectively detect light in this band. Also, the bandpass filter 122 may be a general color filter.

Figure 3:
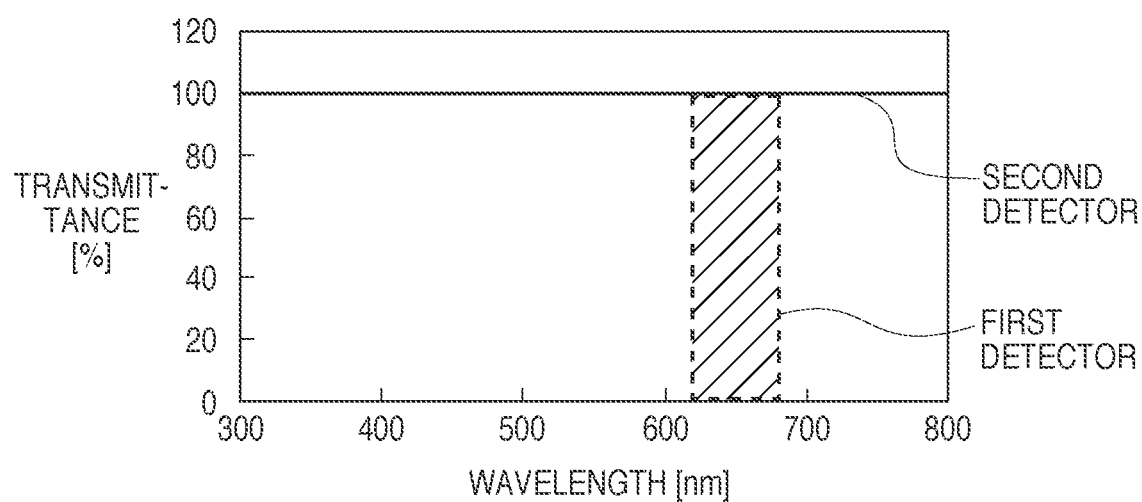
FIG. 3 is a graph illustrating ideal spectral sensitivities that a first detector and second detector should have.

FIG. 3 illustrates ideal spectral sensitivities that the first detector 120 and second detector 121 should have. Note that spectral sensitivity is represented as the spectral transmittance. One-hundred-percent transmittance means that all components of light which must strike the first detector 120 or second detector 121 upon passing through the optical system 101 strike the first detector 120 or second detector 121. As illustrated in FIG. 2, the infrared cut filter 102 may have a cutoff wavelength with significant incident angle dependence in the band of 620 nm to 680 nm. Under the circumstance, to accurately detect light in this band, the first detector 120 ideally has a rectangular spectral sensitivity as indicated by a hatched portion in FIG. 3. Also, to detect the average luminance in a band wider than that which the first detector 120 detects, the second detector 121 ideally has an even spectral sensitivity.

Figure 4:
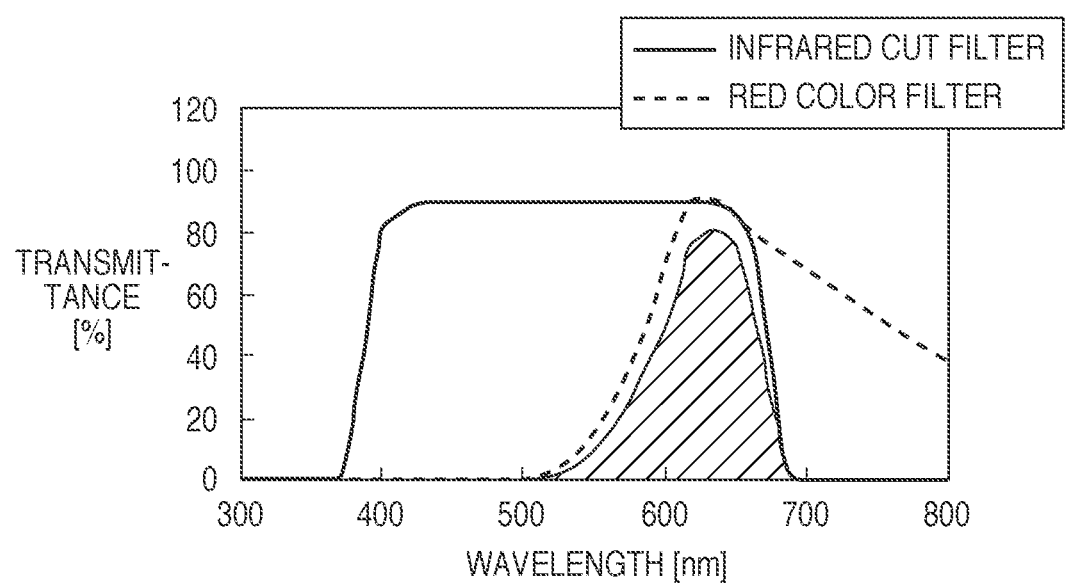
FIG. 4 is a graph illustrating the spectral transmittance of a bandpass filter for the first detector.

The bandpass filter 122 may include, for example, two filters (to be referred to as a first filter and second filter hereinafter) stacked on each other. Note that the first filter can have the same characteristic as the infrared cut filter 102 arranged between the optical system 101 and the image sensor 103. The second filter can have the same characteristic as red color filters (not shown) arrayed on the image sensor 103. The first filter defines the cutoff wavelength of the bandpass filter 122 on the long-wavelength side, whereas the second filter defines the cutoff wavelength of the bandpass filter 122 on the short-wavelength side. Referring to FIG. 4, the spectral transmittance of the bandpass filter 122 is illustrated by a hatched portion surrounded by a thin solid line. Referring to FIG. 4 as well, a bold line exemplifies the spectral transmittance of the first filter, and a dotted line exemplifies the spectral transmittance of the second filter. The characteristic of the bandpass filter 122 is determined by combining the first filter and second filter.

The photoelectric conversion elements of the first detector 120 and second detector 121 can be arranged on the optical axis of the optical system 101 (the position at zero image height) or in its vicinity. Therefore, the output values of the first detector 120 and second detector 121 in a band in the vicinity of the cutoff wavelength of the infrared cut filter 102 decrease only slightly upon this arrangement. This makes it possible to accurately detect the average luminance of an object and the luminance of the object in a band in the vicinity of the cutoff wavelength.

A method of executing color shading correction by determining a color shading correction coefficient for each photographing condition in accordance with the relative luminance detected by the sensor 113 will be described next. The relative luminance means herein the luminance of an object in a band in the vicinity of the cutoff wavelength relative to the average luminance of the object. Also, the color shading correction coefficient determined in accordance with the relative luminance is used to execute color shading correction of, among a red signal (R), a green signal (G), and a blue signal (B), a signal of a color whose wavelength is close to the cutoff wavelength, that is, the red signal.

At the time of determining the photographing condition, for example, at the time of AE and AF before photography, the relative luminance can be detected by the above-mentioned method using the sensor 113 (detection step). This relative luminance is provided to the corrector 106. The corrector 106 executes color shading correction of the image, sensed by the image sensor 103, using a color shading correction coefficient with a value which increases as the relative luminance provided from the sensor 113 gets higher (correction step). That the relative luminance is higher means that the sensed image is more strongly influenced by the incident angle dependence of the infrared cut filter 102. In view of this, the corrector 106 sets a larger color shading correction coefficient for a red signal (R) for a higher relative luminance.

Figure 5:
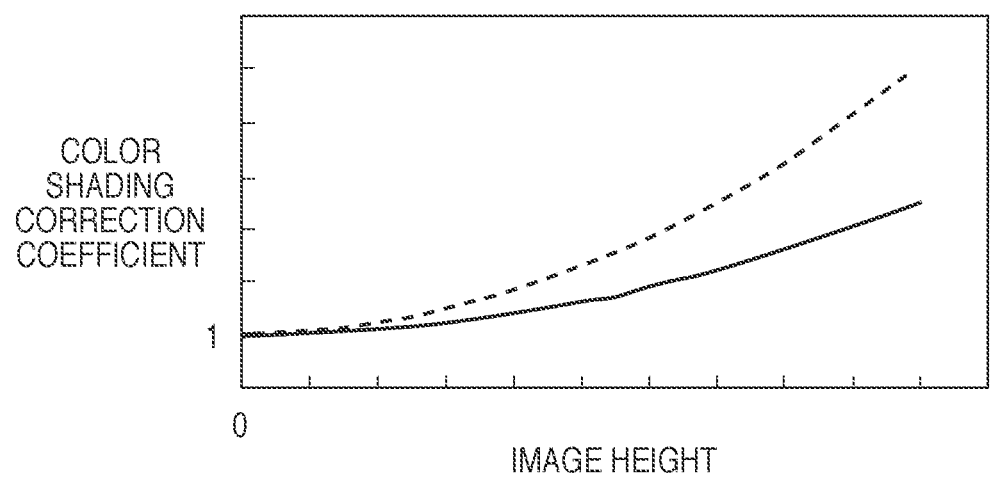
FIG. 5 is a graph illustrating the image height in the horizontal direction, and color shading correction coefficients (gain correction for each column) for a red signal.

FIG. 5 illustrates the image height in the horizontal direction, and color shading correction coefficients (gain correction for each column). Referring to FIG. 5, an image height=0 indicates the center of the image sensing surface of the image sensor 103, and the color shading correction coefficient is normalized assuming its value at zero image height as 1. In this embodiment, a color shading correction coefficient when the relative luminance has a given value is stored in the internal memory 111 as that under standard conditions. Referring to FIG. 5, a solid line exemplifies the value of the color shading correction coefficient under standard conditions. Referring to FIG. 5 as well, a dotted line exemplifies the value of the color shading correction coefficient when the relative luminance is higher under given conditions than under standard conditions. The value C of the color shading correction coefficient at the relative luminance L provided from the sensor 113 and the image height H is given by:

$$C = CS \times L/LS = CS \times k \quad (1)$$

where LS is the relative luminance under standard conditions, CS is the value of the color shading correction coefficient at the relative luminance LS and image height H, and k=L/LS.

The corrector 106 determines the value C of the color shading correction coefficient at each image height H in accordance with equation (1), and stores them in the internal memory 111 (a preparation step in the correction step). Note that the value of the color shading correction coefficient at each of a plurality of image heights H and the relative luminance LS is stored in the internal memory 111 in advance.

At the time of photography (an operation of sensing an image of an object, and recording the image), the optical system controller 108 drives an optical member such as a quick return mirror (not shown) to change the optical path. Thus, the light from the object forms an image on the image sensing surface of the image sensor 103 upon passing through the optical system 101 and infrared cut filter 102. The image sensor 103 senses the image formed on the image sensing surface, and outputs it as an electrical signal (an analog signal in this case). The image sensor 103 can be, for example, a CCD image sensor or a CMOS image sensor. The analog signal output from the image sensor 103 is processed by the analog signal processor 104, and converted into a digital signal by the A/D converter 105.

The image output from the A/D converter 105 as a digital signal is provided to the corrector 106. The corrector 106 reads out the value C of the color shading correction coefficient at each image height H, which is determined by the above-mentioned method and stored in the internal memory 111, from the internal memory 111. The corrector 106 then executes color shading correction of a red signal (R) in the image, sensed by the image sensor 103, using the value C of the color shading correction coefficient (a correction execution step in the correction step). As for a green signal (G) and a blue signal (B), standard color shading correction coefficients are stored in the internal memory 111 and read out, thereby correcting them. The image having undergone the color shading correction undergoes a development process (e.g., a color process) by the image processor 107, and is stored in the internal memory 111 or output from the image output unit 112.

Although the aforementioned color shading correction method is executed by gain correction for each column, more effective correction can be realized by simultaneously performing gain correction in the row direction as well. It is also possible to concentrically correct color shading in accordance with the image height. Also, in the above description, color shading correction coefficients are determined for individual photographing conditions by multiplying the color shading correction coefficient by a constant (k=L/LS). Adjustment control may be performed so that the field is divided into a plurality of blocks in accordance with the image height, and the color shading correction coefficient is multiplied by kn (n=1, 2, 3, . . . ) for each block. Color shading correction coefficients may be obtained by, for example, a method of referring to a lookup table or a method of calculation using polynomial function approximation.

Figure 6:
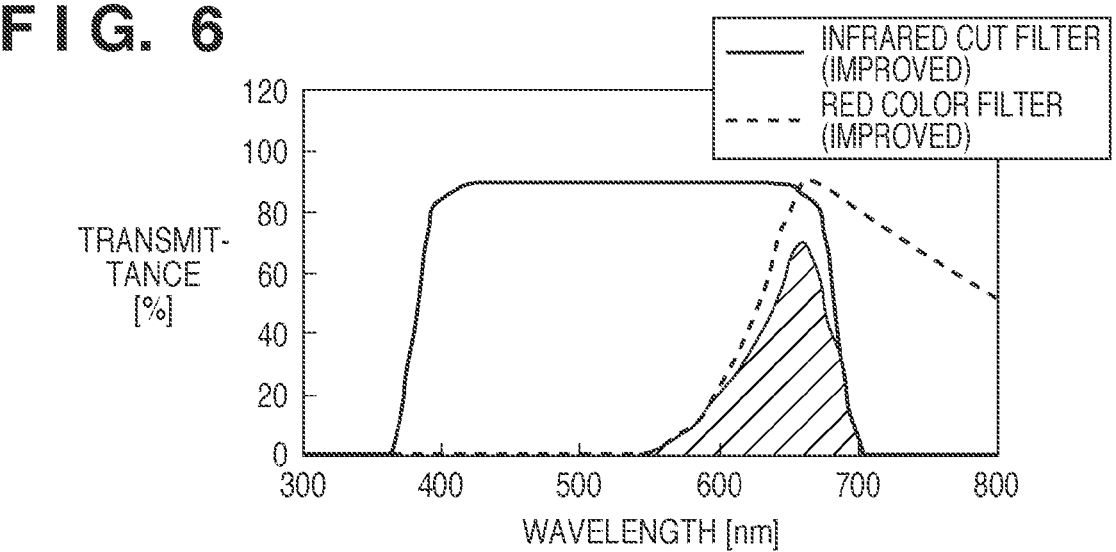
FIG. 6 is a graph illustrating the spectral transmittance of another bandpass filter for the first detector.

The image sensing region of the image sensor serving as an AF sensor generally has an area smaller than that of the image sensor 103 which senses an image of an object. Therefore, when the sensor 113 is simultaneously used as the image sensor serving as an AF sensor, the sensed image is less likely to be influenced by the incident angle dependence of the first filter which form the bandpass filter 122 even, if an infrared cut filter with the same characteristic as the infrared cut filter 102 is used as the first filter. For this reason, even the bandpass filter 122 with a spectral transmittance as indicated by a hatched portion in FIG. 4 is satisfactorily practical. Nevertheless, to more accurately detect the relative intensity in a band in the vicinity of the cutoff wavelength, the bandpass filter 122 may include the following first filter and second filter. That is, a filter with a spectral transmittance, which realizes long-wavelength cutoff for wavelengths slightly closer to the long-wavelength side than the infrared cut filter 102 arranged between the optical system 101 and the image sensor 103, is used as a first filter. Also, a filter with a spectral transmittance, which realizes short-wavelength cutoff for wavelengths slightly closer to the long-wavelength side than the red color filters formed on the image sensor 103, is used as a second filter. FIG. 6 shows an example of these spectral transmittances. It is possible to bring the spectral transmittances of the first filter and second filter close to more ideal spectral transmittances (FIG. 3).

Figure 7:
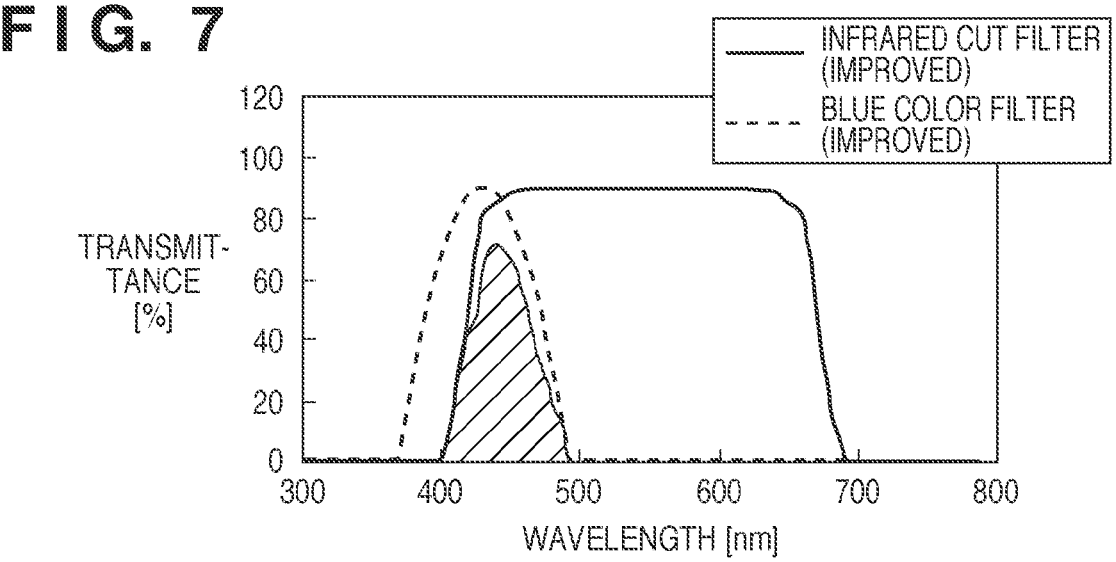
FIG. 7 is a graph illustrating the spectral transmittance of still another bandpass filter for the first detector.
Figure 8:
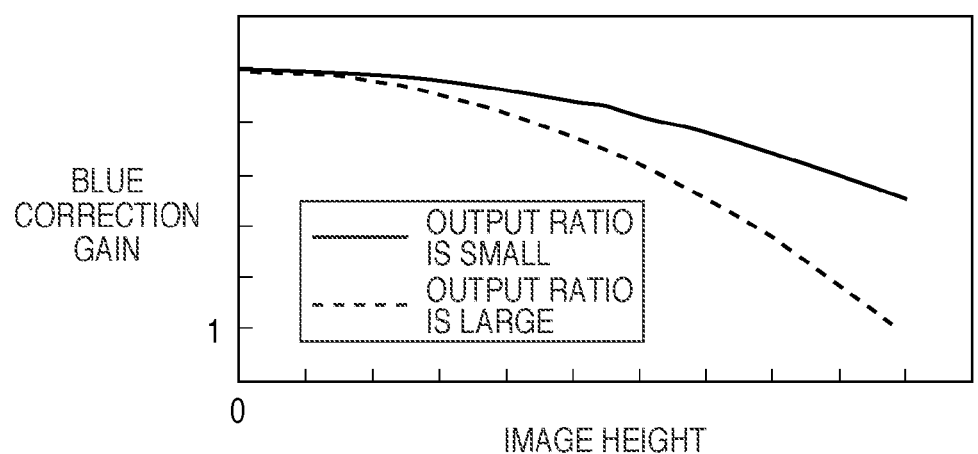
FIG. 8 is a graph illustrating the image height in the horizontal direction, and color shading correction coefficients (gain correction for each column) for a blue signal.

In the same way as above, color shading correction can be executed for the incident angle dependence of the ultraviolet cutoff wavelength. FIG. 7 shows an example of the spectral transmittance of a bandpass filter for a first detector which detects the luminance in a band in the vicinity of the ultraviolet cutoff wavelength. Note that as the incident angle increases, as indicated by a dotted line in FIG. 2, the cutoff wavelength shifts toward the short-wavelength side, so the bandpass filter becomes more likely to pass blue wavelengths on the ultraviolet cutoff side. Hence, the corrector 106 sets the value of a color shading correction coefficient for a blue signal (B) smaller for a higher relative intensity in a band in the vicinity of the ultraviolet cutoff wavelength. FIG. 8 shows an example of a color shading correction coefficient for a blue signal (B). In other words, the present invention is also applicable to an image sensing system equipped with an ultraviolet cut filter or both infrared and ultraviolet cut filters in place of the infrared cut filter 102.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241888, filed Oct. 20, 2009, which is hereby incorporated by reference herein in its entirety.

What is claimed is:

1. An image sensing system comprising:
   an image sensor having an image sensing surface;
   a filter arranged between the image sensing surface and an optical system which forms an image of an object on the image sensing surface;
   a sensor configured to detect a relative luminance of the object in a band in the vicinity of a cutoff wavelength of the filter relative to an average luminance of the object via the optical system; and
   a corrector configured to execute color shading correction of the image, sensed by the image sensor, using a color shading correction coefficient determined by the relative luminance detected by the sensor,
   wherein the sensor includes (a) a bandpass filter configured to pass a component, in the band in the vicinity of the cutoff wavelength of the filter, of light having passed through the optical system, and (b) a first detector configured to detect a luminance of the object in the band in the vicinity of the cutoff wavelength of the filter by detecting the light having passed through the bandpass filter, and
   wherein the sensor detects the relative luminance based on an output of the first detector.

2. The system according to claim 1, wherein the color shading correction coefficient has a larger value at a position with a higher image height.

3. The system according to claim 1, wherein the sensor is built into a sensor module including at least one of an AF sensor and an AE sensor.

4. An image sensing system comprising:
   an image sensor having an image sensing surface;
   a filter arranged between the image sensing surface and an optical system which forms an image of an object on the image sensing surface;
   a sensor configured to detect a relative luminance of the object in a band in the vicinity of a cutoff wavelength of the filter relative to an average luminance of the object via the optical system; and
   a corrector configured to execute color shading correction of the image, sensed by the image sensor, using a color shading correction coefficient determined by the relative luminance detected by the sensor,
   wherein the sensor includes:
   (a) a bandpass filter configured to pass a component, in the band in the vicinity of the cutoff wavelength of the filter, of light having passed through the optical system,
   (b) a first detector configured to detect the light having passed through the bandpass filter, and
   (c) a second detector configured to detect a component, in a band wider than a passband of the bandpass filter, of the light having passed through the optical system, and
   wherein the average luminance of the object is detected using the second detector, and a luminance of the object in the band in the vicinity of the cutoff wavelength of the filter is detected using the first detector, thereby detecting the relative luminance.

5. An image sensing system comprising:
   an image sensor having an image sensing surface;
   a filter arranged between the image sensing surface and an optical system which forms an image of an object on the image sensing surface;
   a sensor configured to detect a relative luminance of the object in a band in the vicinity of a cutoff wavelength of the filter relative to an average luminance of the object via the optical system; and
   a corrector configured to execute color shading correction of the image, sensed by the image sensor, using a color shading correction coefficient determined by the relative luminance detected by the sensor,
   wherein the filter includes an infrared cut filter, and
   wherein the corrector executes color shading correction of a red signal in the image, sensed by the image sensor, using a color shading correction coefficient with a value which increases as the relative luminance detected by the sensor gets higher.

6. An image sensing system comprising:
   an image sensor having an image sensing surface;
   a filter arranged between the image sensing surface and an optical system which forms an image of an object on the image sensing surface;
   a sensor configured to detect a relative luminance of the object in a band in the vicinity of a cutoff wavelength of the filter relative to an average luminance of the object via the optical system; and
   a corrector configured to execute color shading correction of the image, sensed by the image sensor, using a color shading correction coefficient determined by the relative luminance detected by the sensor,
   wherein the filter includes an ultraviolet cut filter, and
   wherein the corrector executes color shading correction of a blue signal in the image, sensed by the image sensor, using a color shading correction coefficient with a value which decreases as the relative luminance detected by the sensor gets higher.

7. A method of correcting color shading of an image sensed by an image sensing system including an image sensor having an image sensing surface, and a filter arranged between the image sensing surface and an optical system which forms an image of an object on the image sensing surface, the method comprising the steps of:
   detecting a relative luminance of the object in a band in the vicinity of a cutoff wavelength of the filter relative to an average luminance of the object; and
   executing color shading correction of the image, sensed by the image sensor, using a color shading correction coefficient determined by the relative luminance detected in the detecting step,
   wherein the step of detecting a relative luminance includes (a) detecting a luminance of the object in the band in the vicinity of the cutoff wavelength of the filter by detecting a component, in the band in the vicinity of the cutoff wavelength of the filter, of light having passed through the optical system and a bandpass filter, and (b) detecting the relative luminance based on the detected luminance.

* * * * *